(12) United States Patent
Fontijn

(10) Patent No.: US 7,624,285 B2
(45) Date of Patent: Nov. 24, 2009

(54) METHOD AND DEVICE FOR PROTECTING USER INFORMATION AGAINST MANIPULATIONS

(75) Inventor: Wilhelmus Fransiscus Johannes Fontijn, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 663 days.

(21) Appl. No.: 10/517,973

(22) PCT Filed: Jun. 11, 2003

(86) PCT No.: PCT/IB03/02391

§ 371 (c)(1),
(2), (4) Date: Dec. 15, 2004

(87) PCT Pub. No.: WO04/001746

PCT Pub. Date: Dec. 31, 2003

(65) Prior Publication Data

US 2005/0235142 A1    Oct. 20, 2005

(30) Foreign Application Priority Data

Jun. 20, 2002  (EP) .................................. 02077453

(51) Int. Cl.
*G06F 21/00* (2006.01)

(52) U.S. Cl. ........................................ 713/193; 726/30
(58) Field of Classification Search ................ 713/193, 713/189, 164, 165; 726/30
See application file for complete search history.

(56) References Cited

U.S. PATENT DOCUMENTS

2005/0235142 A1 * 10/2005 Fontijn ........................ 713/165

FOREIGN PATENT DOCUMENTS

| EP | 1102249 A1 * | 5/2001 |
| WO | WO0055861 A1 | 9/2000 |
| WO | WO0195327 A2 | 12/2001 |
| WO | WO0195327 A3 | 12/2001 |
| WO | WO0215185 A1 | 2/2002 |

* cited by examiner

*Primary Examiner*—Gilberto Barron, Jr.

(57) ABSTRACT

A method of protecting user information against manipulations provides a high level of protection against any kind of manipulation without increasing the overhead significantly, by storing the user information in user channel packets of a user channel, assigning state information to the user channel packets, the state information being used to indicate if a user channel packet has been manipulated and/or is unstable or not, and storing the state information assigned to the user channel packets in an additional hidden channel embedded in the user channel, the state information assigned to a user channel packet being stored in the associated hidden channel packet.

21 Claims, 3 Drawing Sheets

METHOD AND DEVICE FOR PROTECTING USER INFORMATION AGAINST MANIPULATIONS

Figure 1:
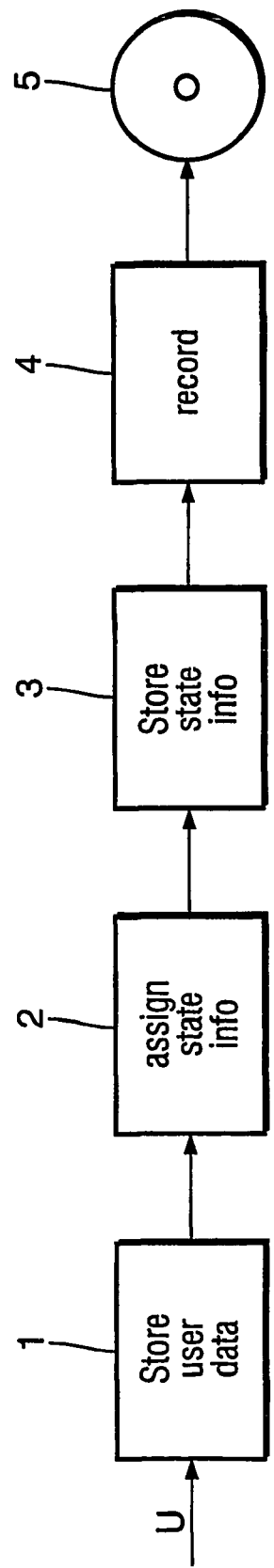

The present invention relates to a method and a device for protecting user information against manipulations. Further, the present invention relates to a corresponding method and a device for reading user information which is protected against manipulations. Still further, the present invention relates to a computer program for implementing said methods, and to a record carrier.

More and more content stored on any type of record carrier shall be protected against hacking and illegal copying. It is increasingly applied of CD and a typical feature of DVD. Many different ways of providing copy protection are proposed. Security information such as copy protection data and other kinds of administrative data are therefore provided on the medium. For instance, a rewriteable optical disk comprises security information in an adaption layer. However, every writeable medium type carries unique risks as non-compliant systems could selectively rewrite part of the security information and thus enabling hacking and illegal copying of the content stored on said medium.

It is therefore useful to record the state of the packets containing the security information. As packets become unstable their state changes. Tracking this state improves reliability and robustness, since unstable packets or packets having a predetermined or illegal state can be easily identified.

However, there is no obvious way to store the state of a packet. It could be done explicitly, i.e. stored in a file, but that would be vulnerable to manipulation and would increase overhead. Using sub-code channels to store the state carries the risk that the solution is not compatible with all existing applications of the sub-code channels. In addition, the information in the sub-code channels can in principle easily be manipulated. At present some CD writers and writer software support writing to all fields in the sector and all sub-channels. Therefore, when using legacy devices, it is not possible to store information that qualifies sectors in a manner that is safe from manipulation.

It is therefore an object of the present invention to provide a method and device for protecting user information against manipulations, in particular recording the state of a packet containing user information in a manner that is safe from manipulation without significantly increasing the required overhead. Further, a corresponding method and device of reading user information protected in this manner shall be provided.

This object is achieved by a method as claimed in claim 1 comprising the steps of:

storing said user information in user channel packets of a user channel, assigning state information to said user channel packets said state information being used to indicate if a user channel packet has been manipulated and/or is unstable or not, and storing said state information assigned to said user channel packets in an additional hidden channel embedded in said user channel, said state information assigned to a user channel packet being stored in the associated hidden channel packet.

The invention is based on the idea to use a hidden channel, that is a way to hide information in a manner that is not accessible by legacy devices, neither when reading nor when writing, to store information that qualifies a sector or group of sectors. Thus, the state of packets, i.e. of a sector or a group of sectors, can be stored safe from manipulation.

The concept of the hidden channel for hiding information from illegal access is known per se. Different ways of employing such a hidden channel are proposed. One possibility disclosed in WO 02/15185 is to detect a polarity of a runlength at a first predetermined position of a runlength-limited code sequence and to set a parameter reflecting the degree of freedom that is present in the run length-limited channel code, e.g. the selection of a merging bit pattern in CD-standard, on the basis of the detected polarity so as obtain a predetermined polarity of a runlength at a subsequent second predetermined position of the runlength-limited code sequence. The predetermined polarity then corresponds to a binary value of the secondary information. Thus, a hidden channel with a small capacity is provided which is positioned very close to the physical channel such that the secondary information is hard to be detected from the EFM bit stream. Another possibility is to use a wobble signal, i.e. a variation of the recording track in radial direction on an optical disk, for storing information in said variation. Only compliant drives will be able to read out information encoded in said variation.

The invention also relates to a method of reading user information protected against manipulations by a method as described above, wherein said user information is stored in user channel packets of a user channel, state information is assigned to said user channel packets said state information being used to indicate if a user channel packet has been manipulated and/or is unstable or not, and said state information assigned to said user channel packets is stored in an additional hidden channel embedded in said user channel, said state information assigned to a user channel packet being stored in the associated hidden channel packet, comprising the steps of:

reading said user information from one or more user channel packets of said user channel, reading the associated state information of the respective hidden channel packets stored in the hidden channel, verifying if the read state information indicates a manipulation or instability of the respective user channel packets, and ignoring user information read from manipulated or unstable user channel packets.

Further, the invention relates to a device for protecting user information against manipulations, comprising:

first storage means for storing said user information in user channel packets of a user channel, assigning means for assigning state information to said user channel packets said state information being used to indicate if a user channel packet has been manipulated and/or is unstable or not, and second storage means for storing said state information assigned to said user channel packets in an additional hidden channel embedded in said user channel, said state information assigned to a user channel packet being stored in the associated hidden channel packet.

Still further, the invention relates to a device for reading user information protected against manipulations by a method described above, wherein said user information is stored in user channel packets of a user channel, state information is assigned to said user channel packets said state information being used to indicate if a user channel packet has been manipulated and/or is unstable or not, and said state information assigned to said user channel packets is stored in an additional hidden channel embedded in said user channel, said state information assigned to a user channel packet being stored in the associated hidden channel packet, comprising:

first reading means for reading said user information from one or more user channel packets of said user channel, second reading means for reading the associated state information of the respective hidden channel packets stored in the hidden channel, verification means for verifying if the read state information indicates a manipulation or instability of the respective user channel packets, and control means for ignoring user information read from manipulated or unstable user channel packets.

In another aspect, the invention relates to a computer program comprising computer program code means for causing a computer to perform the steps of the methods as described above when said computer program is run on a computer.

Finally, the invention relates to a record carrier, in particular optical record carrier, comprising:

user information stored in user channel packets of a user channel, state information stored in an additional hidden channel embedded in said user channel for protecting said user information against manipulations, wherein said state information is used to indicate if a user channel packet, to which said state information is assigned, has been manipulated and/or is unstable or not and wherein said state information is stored in a hidden channel packet associated to the user channel packet of said user information.

Optical disks, such as for instance a CD-RW that complies to a so-called Sapphire secure digital storage specification comprises a so-called key locker area, which is a reserved area in the lead-in area for storing certain user information, such as cryptographic keys, usage rights and other security or administrative information. A method of protecting user information according to the invention is preferably applied to protect user information that shall be stored in the key locker area on an optical disk. It should be noted that the invention can be applied to any optical disk, i.e. read only, recordable or rewriteable disks.

In another aspect of the invention the state information comprises predetermined state values assigned to said user channel packets and stored in said hidden channel packets. Said state values indicate the present state of a packet of the user channel and can be checked to verify if said packet is manipulated or unstable or not. Further, said state values can be set to predetermined values to indicate what kind of information is stored in the corresponding user channel packet. It should be noted that the absence of state information generally indicates a manipulated or unstable packet.

As already mentioned, the method of protecting user information against manipulations is preferably applied to protect administrative and/or security information, in particular copy protection information, usage rights, asset keys, device revocation lists, key locker pointers and/or cryptographic keys. Such information is stored in a key locker area on an optical disk.

In a preferred embodiment it is proposed that a state value of $00 is assigned to a user channel packet containing administrative and/or security information, a state value of a predetermined bit sequence is assigned to virgin user channel packets containing no user information, a cryptographic key, in particular a key locker key, is assigned to a user channel packet containing usage rights and asset keys, in particular a key locker, and no value is assigned to unstable or manipulated user channel packets. Four different types of user channel packets comprising different types of information are thus distinguished, and different types of state values are assigned to said different types of user channel packets. By use of the different state values assigned to said different types of packets and stored in the respective hidden channel packets a reading device can identify and distinguish the state of the corresponding user channel packet and can check, if the user information stored in a user channel packet shall be used or not. This can be done by the reading device on a hardware level without the involvement of any firmware or a host device thus being a high barrier for hackers.

Preferably the administrative and/or security information is stored in the first valid user channel packet of a key locker area provided in the lead-in area on an optical disk, and usage rights and asset keys, in particular a key locker, are stored in at least one user channel packet, particularly the $10^{th}$ and $19^{th}$ user channel packet of said key locker area. If any of said packets has become unstable or has been manipulated, the user information is shifted to the first previous available packet.

Further preferred embodiments of the invention are defined in the dependant claims.

Figure 2:
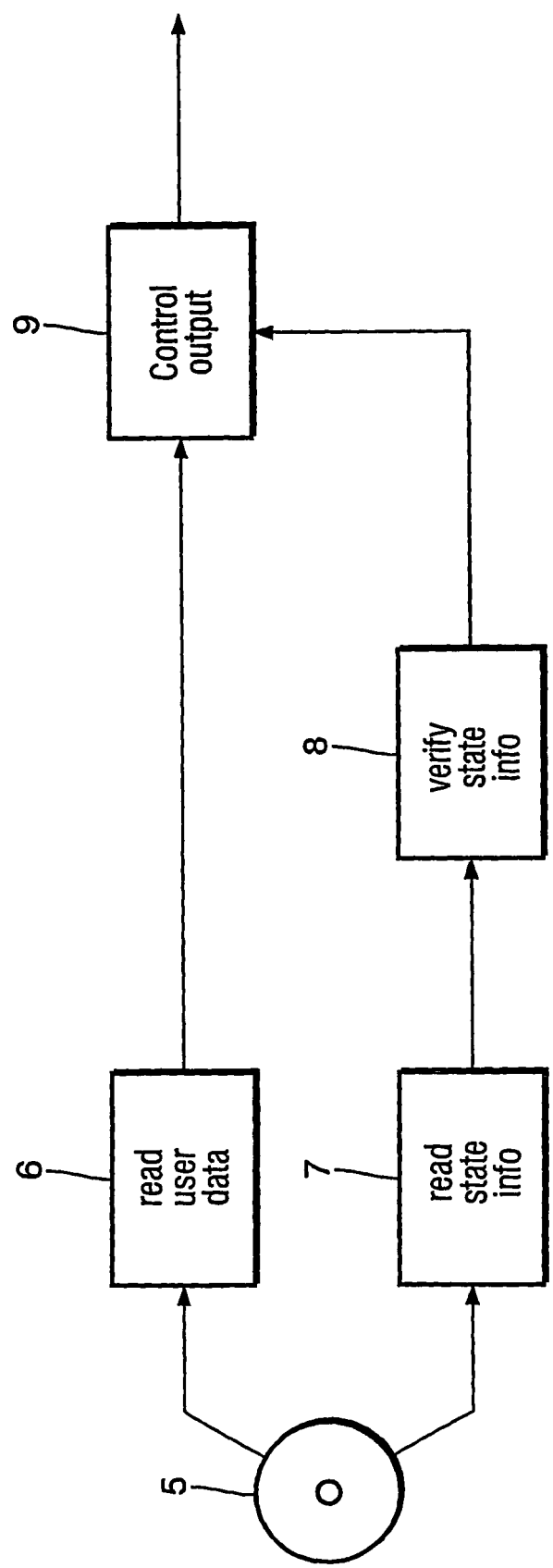
Figure 3:
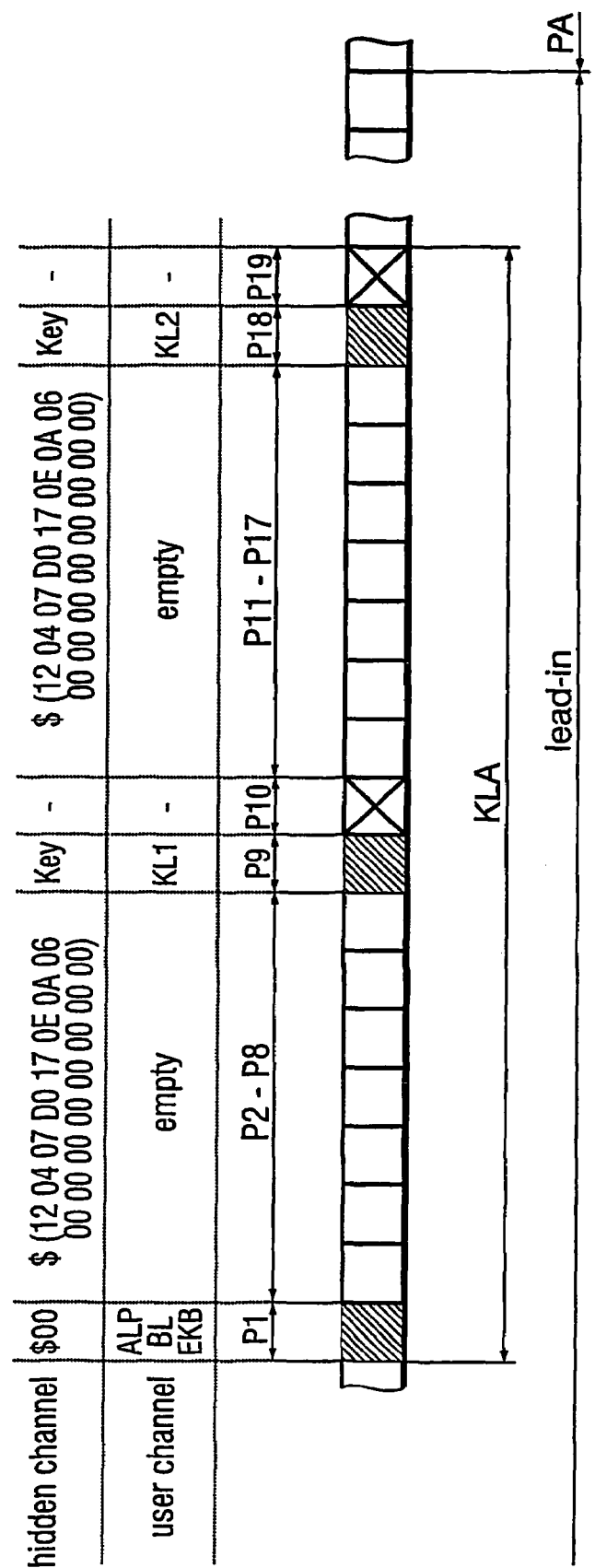

The invention shall now be explained in more details with reference to the drawings in which FIG. 1 shows a block diagram of a device for protecting user information according to the invention, FIG. 2 shows a block diagram of a device for reading user information according to the invention, and FIG. 3 shows an embodiment of the data structure in a key locker area.

FIG. 1 shows a block diagram of a device for protecting user information against manipulation according to the invention. User information U, such as administrative and/or security information, e.g. for copy protection of content, stored on the same medium or transmitted together with said user information, is stored by a first storage means 1 in a user channel. Said user channel is divided into user channel packets, each packet comprising one or more sectors. Thus, the user data U is split up and stored in those packets. In an assigning unit 2 state information the state of said user channel packets is assigned to those packets. By definition different type of states of those packets shall be distinguished by use of predetermined types of state information. Said state information is thereafter stored by second storage means 3 in an additional hidden channel that is not accessible by legacy devices, thus preventing or making hacking of said state information more difficult. More particularly, said state information is stored in hidden channel packets of said hidden channel, which hidden channel packets are preferably each assigned to an associated user channel packet, thus leading to a 1:1 correlation. Finally the user data stored in the user channel and state information stored in the hidden channel are recorded by a recording unit 4 on a recording medium 5, such as an optical disk. It should be noted that the medium 5 can be any kind of recording medium, such as CDs, DVDs, DVR media, hard drives, MO disks or tapes. Further, the invention also applies when said user data and said state information are not recorded on a medium, but are transmitted as a data stream over a network, such as the internet.

FIG. 2 shows a block diagram of a device for reading user information protected against manipulations as described above. In a first step the user information is read by a first reading means 6 from the record carrier 5, in particular user information is read from one or more user channel packets. At the same time or thereafter a second reading 7 means reads the associated state information for those user channel packets, i.e. accesses the corresponding hidden channel packets to retrieve the state information stored therein. Said state information is verified by a verification unit 8 in order to verify if said state information indicates a manipulation or instability of a respective user channel packet or not. In the shown embodiment of the reading device a control unit 9 is finally provided for controlling the output of the read user data by use of the verified state information. Preferably, user data that has been read from manipulated or unstable user channel packets shall not be outputted but be ignored, while user data that has been read from valid user channel packets shall be outputted.

A preferred embodiment of the invention applied for protecting security information stored in a key locker area (KLA) in the lead-in area of a rewriteable optical CD (CD-RW) shall now be explained with reference to FIG. 3. Therein the data structure of said key locker area on a CD-RW is shown. In a particular embodiment of such a CD-RW formatted disk the key locker area KLA has a reserved space of a predetermined length, e.g. 10 seconds length, starting at a predetermined time, e.g. 90 seconds, before the start of the program area PA. The KLA for instance, starts at 98:30:00 and ends at 98:39:74. As an example, 19 packets of 64 KB each (1216 KB in total) are written in this area during formatting, starting at the beginning of the KLA. The remaining reserved space is not occupied. At formatting all user data bytes in the KLA shall be set to $AA.

In the first block of the first valid packet P1 of the KLA an adaption layer parameter space (ALP) is located. This structure contains key locker pointers, the key locker being a container for usage rights and asset keys. The ALP is not encrypted. Contiguous to the ALP a black list (BL) or device revocation list, i.e. a list containing device identifiers that have been declared invalid, is placed starting in the same sector. The BL is not encrypted.

The size of the BL is at most 3.5 KB. At least one sector is allocated to the ALP and BL combined. Further, an enabling key block (EKB), i.e. a data structure that is used to communicate a secret cryptographic key to a set of authorized devices or PC applications, is placed in the KLA, contiguous to the BL starting in the first next sector. The EKB is not encrypted. The size of the EKB is at most 60 KB (30 sectors). The ALP, BL and EKB combined occupy one packet (P1). Partly occupied or empty sectors shall be padded with $00.

The shown embodiment of the rewriteable disk further contains two identical instances of the key locker KL which each occupy at least one packet and at most two packets. Their locations are recorded in the ALP, in KL1 and KL2, respectively. Both duplicates of the KL are encrypted with the same random key. Partly occupied or empty sectors shall be padded with $00. The initial location of the first KL instance (KL1) is the 10$^{th}$ packet P10 of the KLA. The initial location of the second KL instance (KL2) is the 19$^{th}$ packet P19 of the KLA. However, in the shown embodiment, the two KL instances KL1 and KL2 have been relocated to packets P9 and P18, i.e. to the nearest preceding packet that is free, because the initial packets P10 and P19 have become unstable as indicated by the crosses in those packets. All user data bytes in those unstable packets P10 and P19 have been set to $FF while the complete content of those packets has been relocated to user channel packets P8 and P18.

All other packets, i.e. packets P2-P8 and P11-P17 are empty packets and are available for storage.

To indicate the state of a packet an additional hidden channel is introduced and embedded in the user data channel. Said hidden channel is divided in hidden channel packets to store state information for each user channel packet separately. The possible values contained in the hidden channel for the embodiment shown in FIG. 3 are:

a) empty: no value is recorded in the hidden channel packet meaning that the corresponding user channel packet is not used and shall not be used by a recording device for storing administrative or security information;

b) a predetermined bit sequence, in particular $(12 04 07 D0 17 0E 0A 06) followed by all zeros: indicates a virgin packet that is available for use by the storage unit;

c) $00 indicates a user channel packet containing the current administrative data, in particular ALP, BL and EKB;

d) a key, e.g. a 128 bit number: indicates that the hidden channel contains a hidden channel key and that the associated user channel packet contains a key locker.

At initialization all packets in the KLA, except the first packet P1, are marked as virgin sectors by recording the predetermined bit sequence (see above b) in the corresponding hidden channel packets. By having a recognizable string followed by $00 the likelihood of a match with a recorded key is slim. The possibility of a match can be eliminated completely by requiring that the hidden channel key may not be half zero.

In the first packet P1 of the KLA the administrative data (ALP, BL and EKB) are recorded. The corresponding hidden channel packet contains $00.

If a key locker is recorded, as it is shown in FIG. 3 for packets P9 and P18 where two instances of the key locker, KL1 and KL2, are recorded, the key locker key, i.e. the cryptographic key that is used to encrypt the key locker, is recorded in the corresponding hidden channel packets of the user channel packets P9 and P18.

If any block of the packet P1 containing the ALP has become unstable the complete content of the packet is relocated to the next free packet in the KLA. Available packets are selected on the basis of the presence of the bit sequence for empty packets (see above b) in the hidden channel. All user data bytes in the unstable packets will be set to $FF, and no information is written to the associated hidden channel packet.

User channel packets whose associated hidden channel packets contain no value shall be ignored by a reading device, which may be part of a security system accessing such a record carrier. Therefore unstable or manipulated packets will not be used in any way by a compliant reading device. Moreover, unstable packets may typically not be read at all. If no hidden channel packet comprising the value $00 is present in the KLA, then the KLA is either damaged or manipulated in an unauthorized manner. The location of valid key lockers are determined by scanning the KLA. Valid key locker packets have a value in the associated hidden channel packet which is not equal to $00 or the bit sequence indicating an empty packet. The user channel packet comprising the administrative data (ALP, BL, EKB) is reconstructed and recorded in the first virgin packet counting from the start of the KLA.

If no hidden channel packet having a hidden channel value other than $00 is present, except for hidden channel packets having no value, then no valid key locker is present. If, nevertheless, a key locker is present, it is damaged beyond repair and/or manipulated.

If there are no state information values at all present in any hidden channel packet in the area reserved for the KLA, there is no KLA recorded at all.

According to the present invention the state information can generally only be written by compliant devices. If a non-compliant device, e.g. a legacy device, writes a packet in the KLA, the hidden channel will be void.

The present invention provides added security because manipulated user channel packets containing an ALP or key locker are ignored as they do not contain valid state information in the associated hidden channel packets. Further, an increased reliability is provided as the distinction between old key lockers having no state information value in the hidden channel and virgin sectors having a predetermined bit sequence in the hidden channel prevents the re-use of unstable packets. Still further, robustness is increased, as it is easier to find the valid key locker if the ALP is lost: the first valid key locker is preceded by a virgin block or the ALP itself. The concept of the invention thus relies on the state information which is stored in an additional hidden channel that can only be read by compliant devices.

The invention claimed is:

1. A method of protecting user information against manipulations, comprising acts of:
   storing said user information in user channel packets of a user channel;
   assigning state information to said user channel packets, said state information indicating a state of a packet independent of a packet value stored in a corresponding user channel packet and being used to indicate if a user channel packet has been manipulated and/or is unstable or not; and
   storing said state information assigned to said user channel packets in an additional hidden channel embedded in said user channel, said state information assigned to a user channel packet being stored in the associated hidden channel packet.

2. The method as claimed in claim 1, wherein said user information is stored in a key locker area.

3. The method as claimed in claim 1, wherein said state information comprises one of a plurality of predetermined state values assigned to said user channel packets and stored in said hidden channel packets.

4. The method as claimed in claim 1, wherein said user information comprises administrative and/or security information.

5. The method as claimed in claim 1, wherein said state information comprises one of a plurality of predetermined state values assigned to said user channel packets and stored in said hidden channel packets, wherein said user information comprises administrative and/or security information, and wherein a state value of $00 is assigned to a user channel packet containing administrative and/or security information, a state value of a predetermined bit sequence is assigned to virgin user channel packets containing no user information, a cryptographic key is assigned to a user channel packet containing usage rights and asset keys, and no value is assigned to unstable or manipulated user channel packets.

6. The method as claimed in claim 1, wherein said user information is stored in a key locker area wherein said user information comprises administrative and/or security information, and wherein said administrative and/or security information is stored in the first valid user channel packet of said key locker area and wherein usage rights and asset keys are stored in at least one user channel packet.

7. A method of reading user information protected against manipulations by storing said user information in user channel packets of a user channel, assigning state information to said user channel packets, said state information being used to indicate if a user channel packet has been manipulated and/or is unstable or not, and storing said state information assigned to said user channel packets in an additional hidden channel embedded in said user channel, said state information assigned to a user channel packet being stored in the associated hidden channel packet, said method comprising acts of:
   reading said user information from one or more user channel packets of said user channel;
   reading the associated state information of the respective hidden channel packets stored in the hidden channel, wherein said state information indicates a state of a packet independent of a packet value stored in the one or more user channel packets;
   verifying if the read state information indicates a manipulation or instability of the respective user channel packets; and
   ignoring user information read from manipulated or unstable user channel packets.

8. The method of reading user information as claimed in claim 7, wherein said verification is done by checking if a valid state value is assigned to a read user channel packet and stored in the respective hidden channel packet and/or if there is at least one user channel packet to which a state value having a predetermined value is assigned is present and/or if there is at least one user channel packet to which no state value is assigned.

9. The method of reading user information as claimed in claim 7, wherein said verification is used to prevent output and/or copying of user information stored in manipulated and/or unstable user channel packets.

10. A device for protecting user information against manipulations, comprising:
    first storage means for storing said user information in user channel packets of a user channel;
    assigning means for assigning state information to said user channel packets said state information indicating a state of a packet independent of a packet value stored in a corresponding user channel packet and being used to indicate if a user channel packet has been manipulated and/or is unstable or not; and
    second storage means for storing said state information assigned to said user channel packets in an additional hidden channel embedded in said user channel, said state information assigned to a user channel packet being stored in the associated hidden channel packet.

11. A device for reading user information protected against manipulations by storing said user information in user channel packets of a user channel, assigning state information to said user channel packets, said state information being used to indicate if a user channel packet has been manipulated and/or is unstable or not, and storing said state information assigned to said user channel packets in an additional hidden channel embedded in said user channel, said state information assigned to a user channel packet being stored in the associated hidden channel packet, said device for reading comprising:
    first reading means for reading said user information from one or more user channel packets of said user channel;
    second reading means for reading the associated state information of the respective hidden channel packets stored in the hidden channel, said state information indicating a state of a packet independent of a packet value stored in the one or more user channel packets;
    verification means for verifying if the read state information indicates a manipulation or instability of the respective user channel packets; and
    control means for ignoring user information read from manipulated or unstable user channel packets.

12. A computer-readable medium containing a program comprising computer program code means for causing a computer to perform the acts of the method as claimed in claim 1 when said computer program is run on a computer.

13. A device-readable record carrier, in particular optical record carrier, comprising:
    user information stored in user channel packets of a user channel;

and state information stored in an additional hidden channel embedded in said user channel used by a device for protecting said user information against manipulations, wherein said state information is used by the device to indicate a state of a packet independent of a packet value stored in a corresponding user channel packet is used by the device to determine if a user channel packet, to which said state information is assigned, has been manipulated and/or is unstable or not and wherein said state information is stored in a hidden channel packet associated to the user channel packet of said user information.

14. The method as claimed in claim 2, wherein said key locker area is located in the lead-in area of an optical record carrier.

15. The method as claimed in claim 4, wherein said user information comprises copy protection information, usage rights, asset keys, device revocation lists, key locker pointers and/or cryptographic keys.

16. The method as claimed in claim 5, wherein said user information comprises copy protection information, usage rights, asset keys, device revocation lists, key locker pointers and/or cryptographic keys.

17. The method as claimed in claim 5, wherein a key locker key is assigned as the crypto-graphic key to a user channel packet containing a key locker including usage rights and as-set keys.

18. The method as claimed in claim 6, wherein said key locker area is located in the lead-in area of an optical record carrier.

19. The method as claimed in claim 6, wherein said user information comprises copy protection information, usage rights, asset keys, device revocation lists, key locker pointers and/or cryptographic keys.

20. The method as claimed in claim 6, wherein said usage rights and asset keys are comprised in a key locker.

21. The method as claimed in claim 6, wherein said usage rights and asset keys are stored in at least the 10th and 19th user channel packet of a key locker area.

* * * * *